United States Patent [19]

Anderson et al.

[11] Patent Number: 4,752,543
[45] Date of Patent: Jun. 21, 1988

[54] UNIVERSAL TERMINAL STORAGE BATTERY WITH HANDLE

[76] Inventors: Carl J. Anderson, 2687 Gemini Dr., Lake Orion, Mich. 48035; Scott J. Cronrath, 219 Philadelphia Ave., Shillington, Pa. 19607; David B. Beidler, 1710 Swamp Pike, Gilbertsville, Pa. 19525

[21] Appl. No.: 35,036

[22] Filed: Apr. 2, 1987

[51] Int. Cl.$^4$ .................................... H01M 2/10
[52] U.S. Cl. ................... 429/179; 429/187; 429/89; 429/122
[58] Field of Search ............. 429/178, 179, 187, 121, 429/122, 123, 100, 96, 175, 176, 89

[56] References Cited

U.S. PATENT DOCUMENTS

| | | | |
|---|---|---|---|
| 198,315 | 6/1864 | Fiandt | D26/6 |
| 470,123 | 3/1892 | Harris | 429/182 |
| 947,575 | 1/1910 | Haschke | 429/82 |
| 1,200,994 | 10/1916 | Shindel | 429/160 |
| 1,316,490 | 9/1919 | Loudon | 429/179 |
| 1,573,922 | 2/1926 | Duggan | 16/114 R |
| 1,782,984 | 11/1930 | Carlile | 429/160 |
| 1,796,343 | 3/1931 | Pierson | 220/94 R |
| 2,052,499 | 8/1936 | Strough | 429/178 |
| 2,132,793 | 11/1938 | Kyle | 429/179 |
| 2,232,800 | 2/1941 | Raney | 429/77 |
| 2,548,558 | 4/1951 | Raney | 429/82 |
| 3,081,373 | 3/1963 | Hughes, Jr. | 429/88 |
| 3,329,531 | 7/1967 | Hennen | 429/88 |
| 3,689,322 | 9/1972 | Lindenberg et al. | 429/178 X |
| 3,770,511 | 11/1973 | Winterbottom et al. | 429/121 X |
| 3,910,800 | 10/1975 | Groby et al. | 429/187 X |
| 4,154,907 | 5/1979 | Crow | 429/179 |
| 4,337,301 | 6/1982 | Rorer et al. | 429/179 |
| 4,346,151 | 8/1982 | Uba et al. | 429/54 |
| 4,371,591 | 2/1983 | Oxenreider et al. | 429/88 |
| 4,383,011 | 5/1983 | McClelland et al. | 429/54 |
| 4,424,264 | 1/1984 | McGuire et al. | 429/179 |
| 4,425,414 | 1/1984 | Solomon | 429/179 |
| 4,435,486 | 3/1984 | Pomaro et al. | 429/1 |
| 4,444,853 | 4/1984 | Halsall et al. | 429/54 |
| 4,448,863 | 5/1984 | Terrell | 429/178 |
| 4,472,486 | 9/1984 | Orsino et al. | 429/179 |
| 4,482,618 | 11/1984 | Orsino et al. | 429/179 |
| 4,579,790 | 4/1986 | Humphreys et al. | 429/179 X |
| 4,632,888 | 12/1986 | Kump et al. | 429/187 |
| 4,634,642 | 1/1987 | Lopex-Doriga | 429/121 |
| 4,645,725 | 2/1987 | Kump et al. | 429/179 |

FOREIGN PATENT DOCUMENTS

2102619 2/1983 United Kingdom .

*Primary Examiner*—Anthony Skapars

[57] ABSTRACT

A storage battery, such as for automotive applications, which employs a novel one piece low profile cover attachable to a conventional battery container. The cover includes two pairs of battery terminals for receiving pressure clamp battery cables ends or battery cable ends designed for attachment to side mount terminals. The cover also includes a movable handle which is an integral part of the cover and which is completely stowable in a recess in the cover.

15 Claims, 7 Drawing Sheets

ID HANDLE

BACKGROUND OF THE INVENTION

This invention relates to storage batteries, and more particularly to a universal automotive storage battery designed for easy use in most vehicles.

Existing storage batteries designed to accept a variety of cable arrangements employ two piece manifold type battery covers. Such two piece covers increase the overall battery size since covers constructed in a manifold design cannot be produced with as low a profile as a one piece cover. Additionally, batteries usable with cables having different cable ends, such as pressure clamp or side mount ends, either require modification of the battery cables or the use of an adapter with the battery cover or cables.

Handles typically used with storage batteries are attached to projections extending from the sides of the battery case. This increases the overall dimensions of the battery and requires the addition of such projections which are not normally provided on conventional battery cases. Handles attached to the battery cover, such as rigid handles, often prove to be a hindrance once the battery is installed. The handle may interfere with closing the vehicle hood, or it may make the use of existing battery hold-down assemblies difficult.

SUMMARY OF THE INVENTION

It is accordingly an object of the present invention to provide a storage battery with a one piece low profile cover.

It is another object of the present invention to provide a novel one piece battery cover that can be affixed to a conventional storage battery container.

It is a further object of the present invention to provide a storage battery with conventional battery posts located along the longitudinal centerline of the battery cover so the battery can be used in automotive applications regardless of the location of the positive and negative battery cables.

It is still another object of the present invention to provide a battery with a cover having sloped portions on which are mounted conventional side mount battery terminals for attachment to automotive battery cables equipped for attachment to side mount terminals.

It is yet a further object of the present invention to provide a battery having both conventional battery posts and conventional side mount battery terminals located on the battery cover so the battery can be used for automotive applications having battery cables equipped for attachment to either conventional posts or conventional side mount terminals.

It is an additional object of the present invention to provide a battery with a handle attached to the battery cover to make handling of the battery easy.

It is a still further object of the present invention to provide a movable handle attached to the battery cover which can be stowed in a recess in the cover when the handle is not in use.

It is yet another object of the present invention to provide a metal adapter that is an integral part of the cover and which enables both conventional battery posts located on the longitudinal centerline of the cover and conventional side mount terminals located on sloped edge portions of the cover to be in electrical contact with the respective post attached to the battery elements.

It is a still further object of the present invention to provide apparatus for adjusting the overall height of a storage battery to enable it to be used in multiple automotive applications.

The present invention provides a novel battery cover which can be attached to a battery case containing conventional storage battery elements. The cover employs a one piece design that allows it to have a very low profile which maximizes the size of the battery plates that can be used without increasing the overall height of the battery.

The cover also includes both battery posts for receiving conventional battery cable pressure clamp ends and side mount battery terminals for receiving battery cable ends designed for attachment to side mount terminals. The use of both battery posts and side mount terminals allows the battery of the present invention to be used for both types of battery cables ends without the necessity of modifying the cables or installing adapters on the cables or the battery cover.

The location of the battery posts on the longitudinal centerline of the cover allows the battery to be used regardless of the orientation of the positive and negative polarity cables. Depending on the cable locations the battery can simply be rotated 180° to accommodate different cable orientations. Additionally, placing the side mount terminals on sloped edge portions of the battery cover allows cables designed for attachment to side mount terminals actually located on the side of the battery case to reach the terminals mounted on the cover.

The battery of the present invention also employs height adjustment apparatus which allows the overall battery height to be changed so the battery can be used in different automotive applications which have varying dimensional requirements. Consequently, the battery of the present invention can be easily used in a variety of automotive applications since the battery can receive battery cables of varying orientation and location and with different cable ends, and additionally different dimensional requirements can be accommodated.

The battery of the present invention also includes a handle for carrying the battery which overcomes all the disadvantages of existing battery handles. The novel handle of this invention is an integral part of the cover and therefore it does not require modification of the battery case. Additionally, the handle is movable so it can be fully stowed in a recess in the battery cover. As a result, the handle does not interfere with use of the battery in any way when it is stowed.

In general, the invention features, in one aspect, a storage battery including a battery container for housing the elements of the storage battery, a one piece cover attached to the battery container having sloping portions adjacent to the longitudinal edge of the cover, a first pair of battery terminals located along a longitudinal centerline of the cover, a second pair of battery terminals located on the sloping portions of the cover, and connection apparatus for establishing electrical contact between the first and the second battery terminal pairs and the battery elements.

In general, the invention features, in another aspect, a storage battery including a battery container for housing the elements of the storage battery, a one piece cover attached to the battery container having sloping portions adjacent to the longitudinal edge of the cover, a first pair of battery terminals located along a longitudinal centerline of the cover, a second pair of battery terminals located on the sloping portions of the cover, connection apparatus for establishing electrical contact between the first and second battery terminal pairs and the battery elements, and a movable handle attached to the battery cover and located on the longitudinal centerline for carrying the battery.

In preferred embodiments, the one piece cover is substantially parallel to the top of the battery case and includes sloping portions that are adjacent to the front edge of the cover and the battery sides. The first pair of battery terminals are terminal posts located adjacent to the sides of the battery. The second pair of battery terminals are internally threaded connectors located substantially parallel to the sloped portions of the cover. The connection apparatus includes a metal adapter that connects the battery plates with the first and second pairs of battery terminals so that a continuous electrical path exists between the battery plates and the battery terminal pairs. The battery cover height does not exceed 1.0 inch. The movable handle includes a handle rotatably connected to the cover so that the handle has a first handle position in which the handle is substantially upright and capable of being used to carry the battery, and a second handle position in which the handle is substantially parallel to the uppermost surface of the battery cover. The battery cover further includes portions defining a recess corresponding to the handle in its second position. The movable handle has a first end and a second end, each of which is connected to the battery in the recess by a cylindrical shaft having a diameter substantially equal to the height of the cover such that the portion of the cover receiving each of the shafts protrudes upward beyond the topmost surface of the cover but below of the first pair of battery terminals.

In general, the invention features, in still another aspect, a storage battery including a battery container for housing the elements of the storage battery, a one piece cover attached to the top of the storage battery container which has a first and second sloping portion located at the cover longitudinal edge adjacent each front corner of the battery, a first pair of upwardly protruding battery posts located along a longitudinal centerline of the cover and adjacent opposite sides of the battery cover, a second pair of battery terminals which includes a pair of internally threaded connectors substantially parallel to the respective sloping portions of the cover in which the first terminal is located on the first sloping portion of the cover and the second terminal is located on the second sloping portion of the cover, a pair of metal adapters integral with the cover which are electrically connected to one battery post and one battery terminal and capable of being electrically connected to the battery element post, and a movable handle which is rotatably connected to the cover and located between the pair of battery posts on the longitudinal centerline and which has an upright position for carrying the battery and a stowed position wherein the handle is stowed in a recess in the cover such the stowed handle lies substantially at or below the uppermost surface of the cover.

In preferred embodiments, the battery external height from the bottommost surface of the battery to the top of the battery posts does not exceed 7.8 inches. The battery includes apparatus for adjusting the height of the entire battery. The height adjustment apparatus is affixed to the battery container and located adjacent the bottommost surface of the battery container, so that the overall height of the battery from the bottommost surface of the battery to the top of the battery posts is adjustable.

Other features and advantages of the invention will be apparent from the following detailed description of the preferred embodiments and from the claims.

For a full understanding of the present invention, reference should now be made to the following description and to the accompanying drawings.

Detailed Description of the Preferred Embodiment

Figure 1:
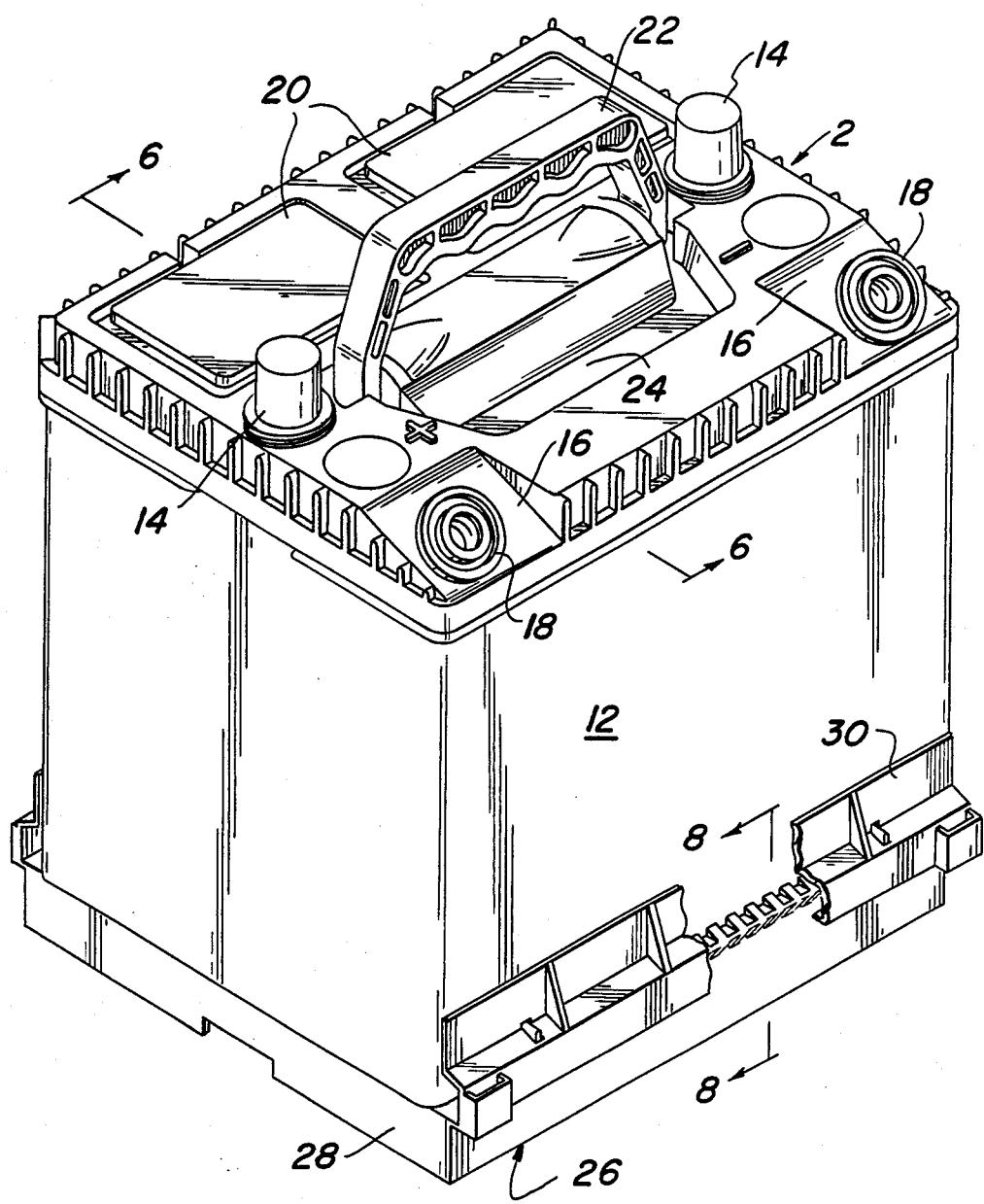
FIG. 1 is a perspective view of a battery having a top cover incorporating a handle which is stowable in the cover and a height adapter which mates with the lower end of the battery container.
Figure 4:
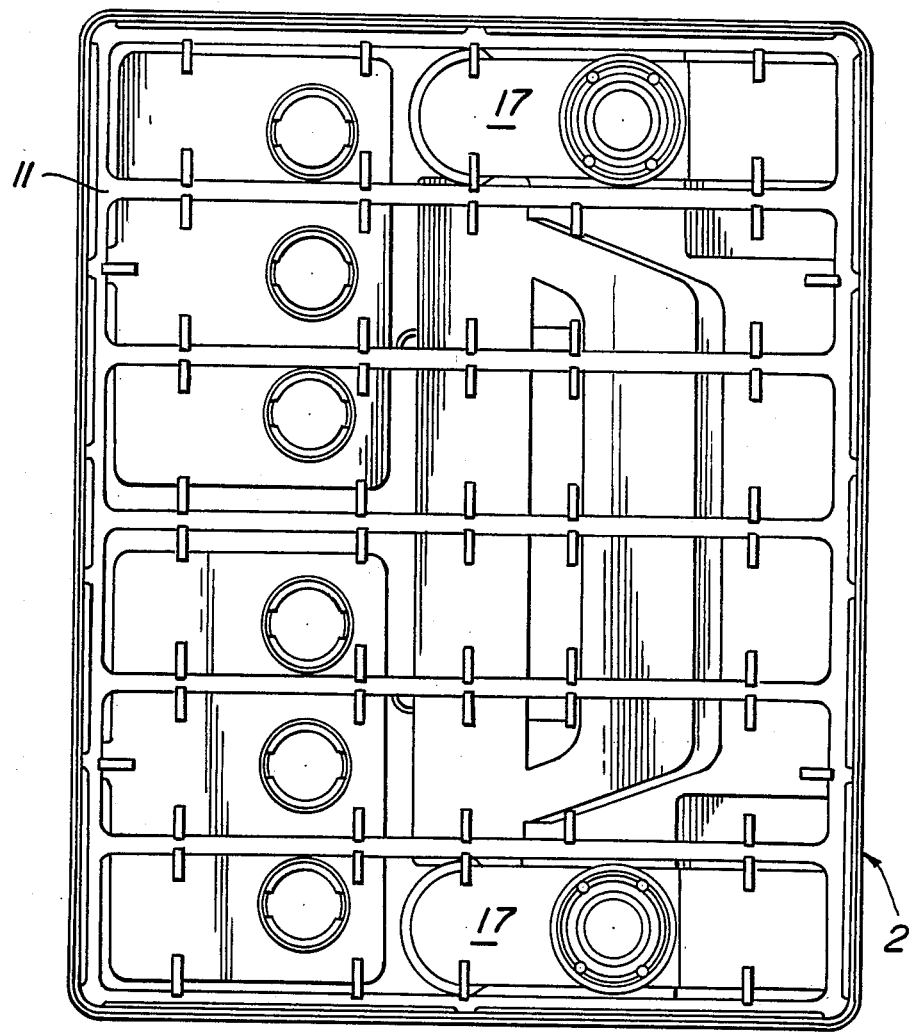
FIG. 4 is a plan view of the underside of the cover shown in FIG. 2.

Referring to FIG. 1, there is shown a perspective view of a preferred embodiment of the invention, which is a novel one piece battery cover, generally designated 10. Cover 2 is attached to a battery container generally designated 12. In preferred embodiments cover 2 fits onto the top of battery container 12 and is heat sealed or bonded thereto. The cover may be molded of known materials, such as polypropylene and its co-polymers, used for this purpose in the art. The elements of the battery (not shown) are constructed in accordance with battery elements commonly used in the automotive field. As will be known to those skilled in the art, a plurality of elements are generally provided in a multiple cell battery, one element in each cell. Electrolyte is provided in each cell via port 21 and the cells are sealed through the heat sealing of the container partition walls 13 to the complementary recess in cover 2 (see FIG. 4).

Figure 2:
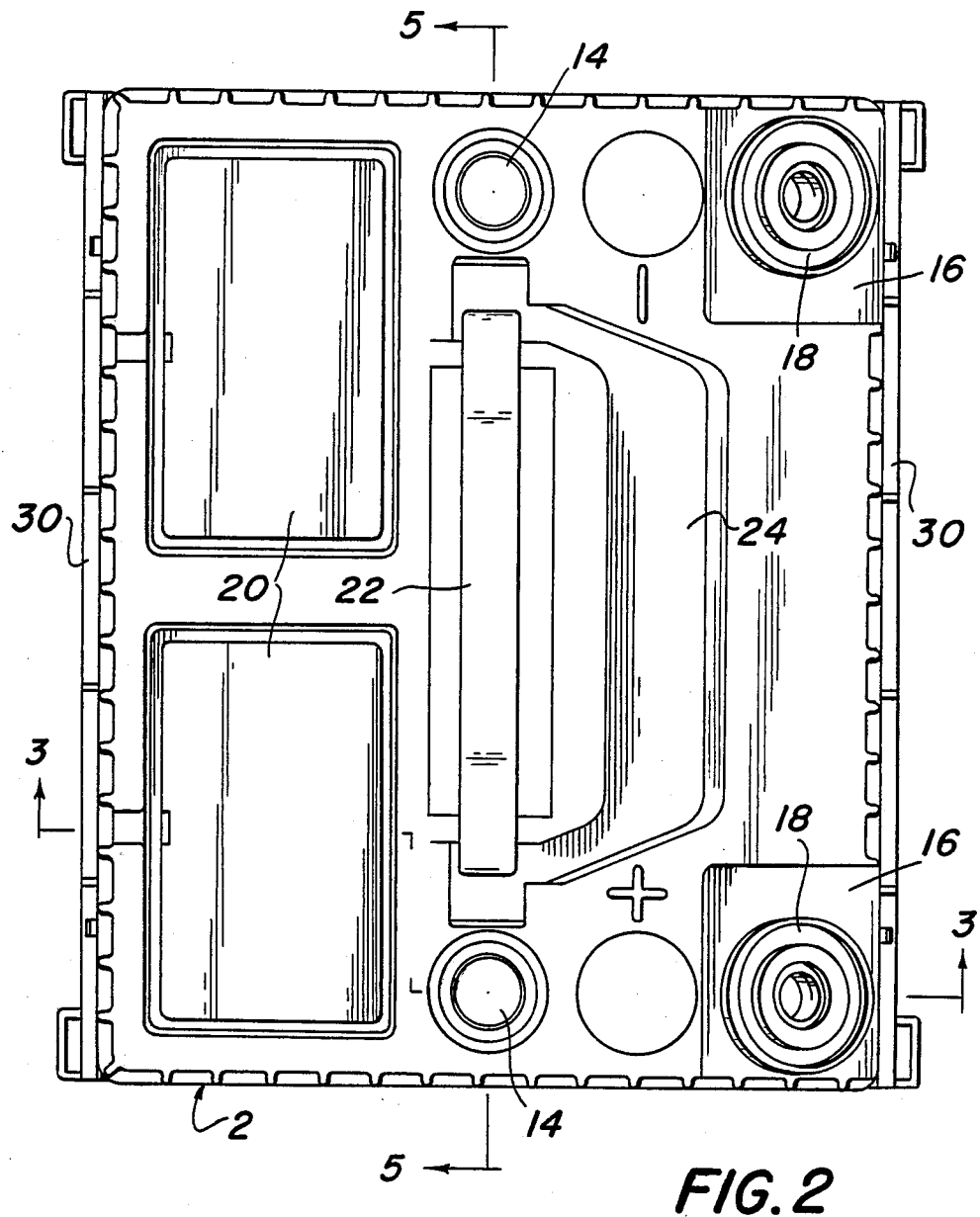
FIG. 2 is a top plan view of the battery shown in FIG. 1.

As shown in FIGS. 1 and 2, battery cover 2 includes a pair of conventional battery posts 14 which are located on the longitudinal centerline of the battery. cover 2, which is substantially flat, has two identical sloping portions 16 located at the front or longitudinal edge of the cover. Additionally, a pair of battery terminals 18 are located on sloping portion 16. These terminals are conventional internally threaded connectors typically used as side mount terminals on automotive batteries. The cover also includes vent covers 20 and a novel movable handle 22 which can be stowed in recess 24 when not in use (shown in FIG. 6).

Figure 8:
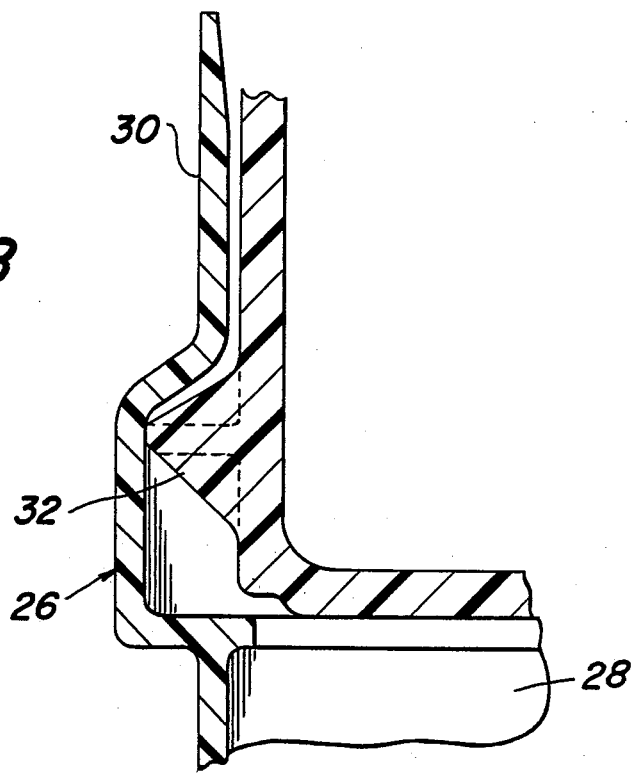
FIG. 8 is a sectional view of the battery container bottom and adapter taken in the direction of arrows 8—8 of FIG. 1.
Figure 7:
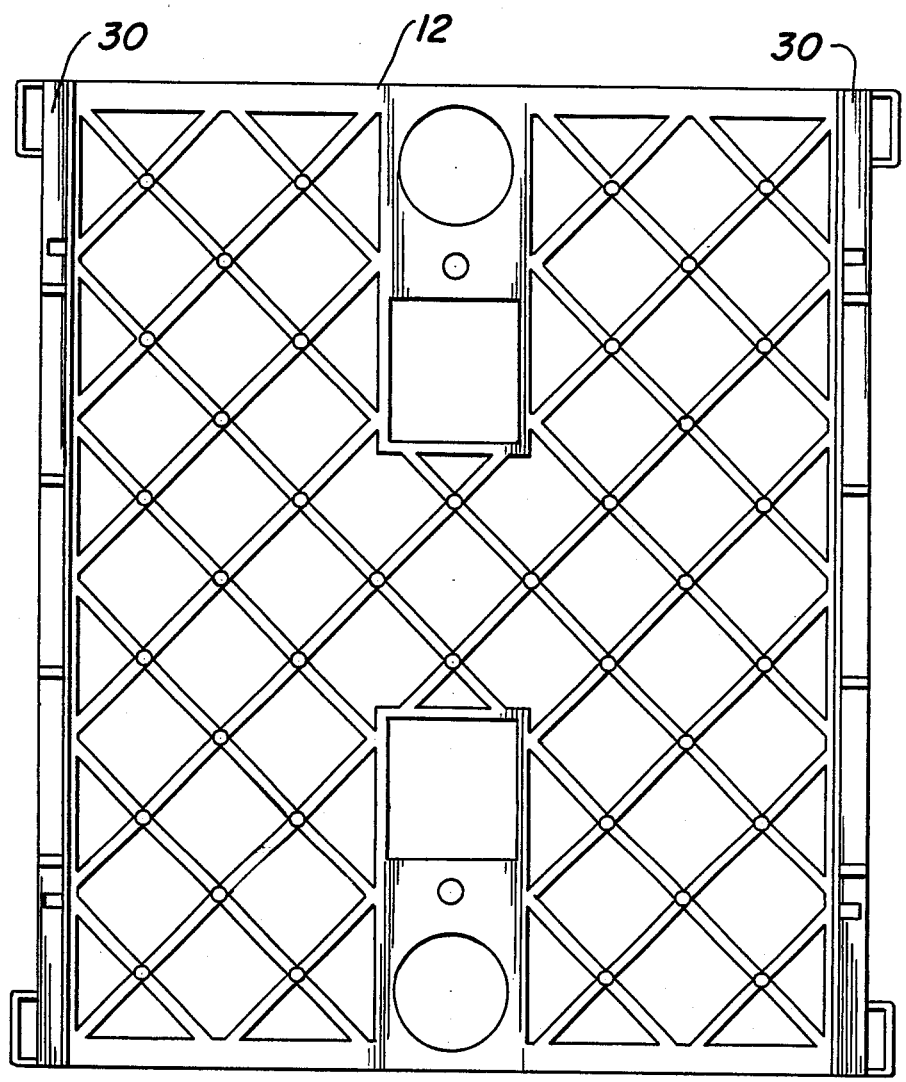
FIG. 7 is a top plan view of the adapter shown mounted on the battery container in FIG. 1.

Height adjustment apparatus, generally designated 26, may be used with battery container 12 to alter the overall height of the battery. This apparatus, which is shown in various views in the figures, includes base 28 for increasing the height of the battery and attachment members 30 for affixing base 28 to battery container 12. A detailed view of attachment members 30 and corresponding protrusions 32, on battery container 12, is shown in FIG. 8.

Figure 3:
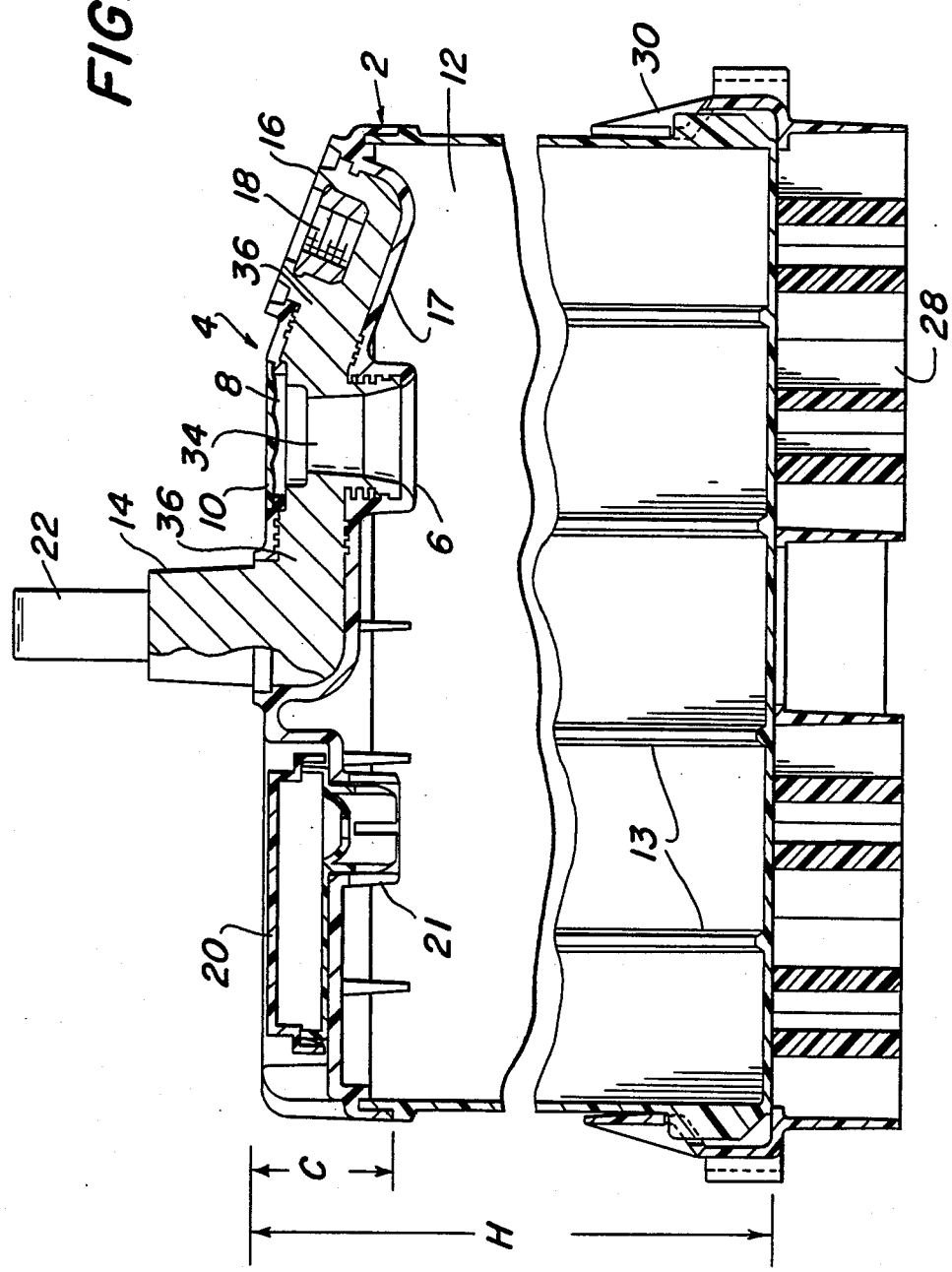
FIG. 3 is a fragmented section through lines 3—3 of FIG. 2; the fragmentation shows the battery container as for shortened.

Referring to FIG. 3, the battery container 12 and cover 2 are shown in cross section. Battery elements (not shown) are typically electrically connected internally through the partition and provide positive and negative end posts (not shown) which are then electrically connected to the respective battery termination means 4. Battery termination means 4 is preferably cast as an integral lead unit and is molded into cover 2 such that the upper surface of the cover surrounds top means 4, except post 14 and terminal 18; the underside of cover 2, as shown at 17, surrounds the bottom of means 4. Thus, means 4 is enclosed except for element post receiving member 34 which is left open at 6 and 8 to the element post. A disk 10 is provided to close opening 8 after the element post and terminal means 4 are electrically interconnected. A typical element post receiving member 34 is located between battery posts 14 and terminals 18 of novel cover 2. The electrical connection between member 34 and the element post will be known to those skilled in the art. Termination means 4 is a cast substantially L-shaped member and is embedded in cover 2. Adapter portions 36 provide electrical contact between the element post, member 34, and both terminal 18 and post 14. The location of termination means 4 allows cover 2 to be fitted onto the top of a conventional battery case in which member 34 is typically located substantially between post 14 and terminal 16 as shown in FIG. 3.

Still with reference to FIG. 3, the uppermost point of cover 2 surrounding terminal 18 is co-planar with the upper surface of cover 2 and the planar face of terminal 18 slopes at an angle "β" off the horizonal by approximately 20°. Such an angle has been found to provide a suitable location for terminal 18 is accordance with the invention while providing sufficient material for bonding cover 2 to container 12.

Figure 5:
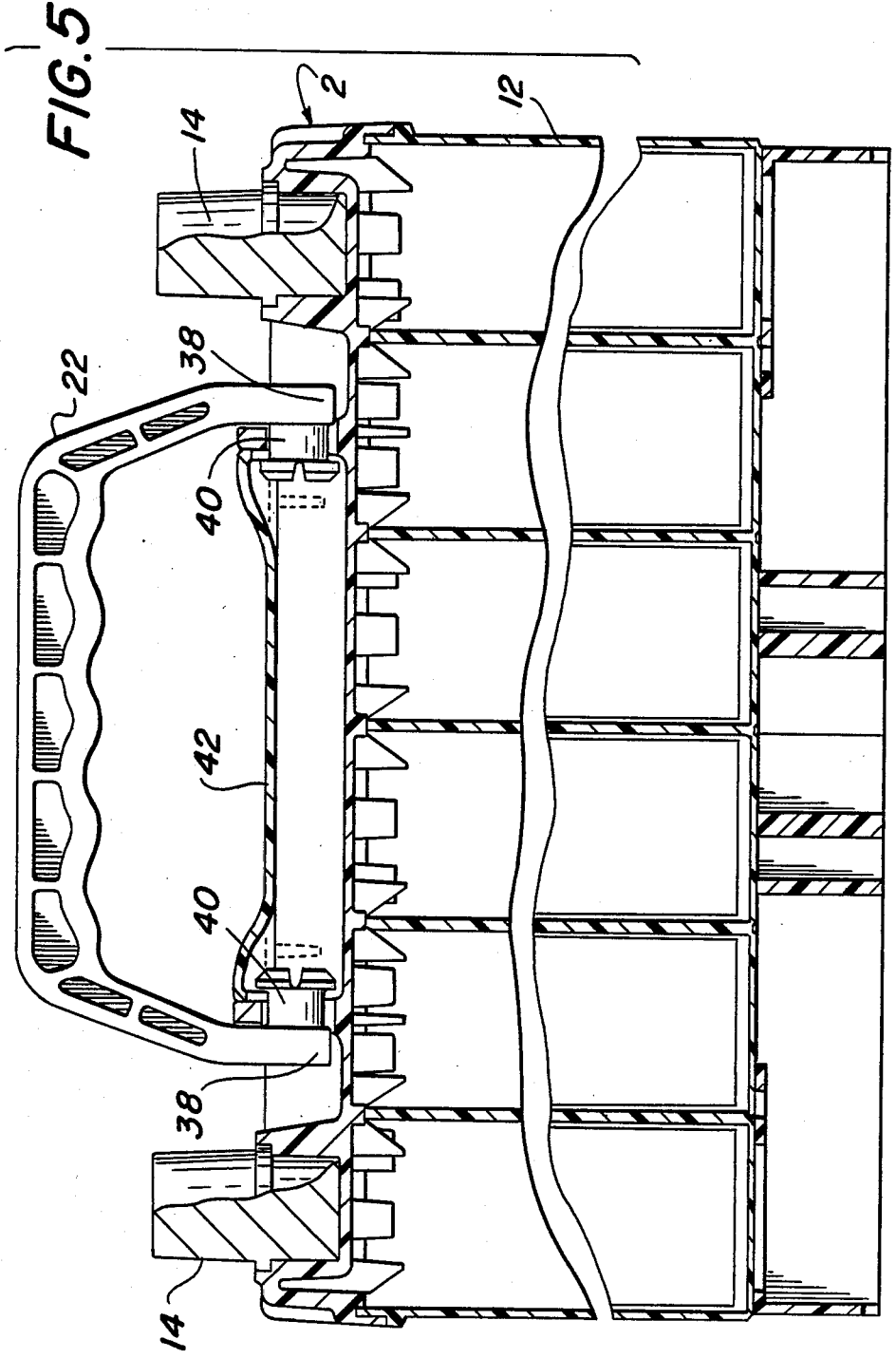
FIG. 5 is a fragmented section through lines 5—5 of FIG. 2; the fragmentation shows the battery container as foreshortened.
Figure 6:
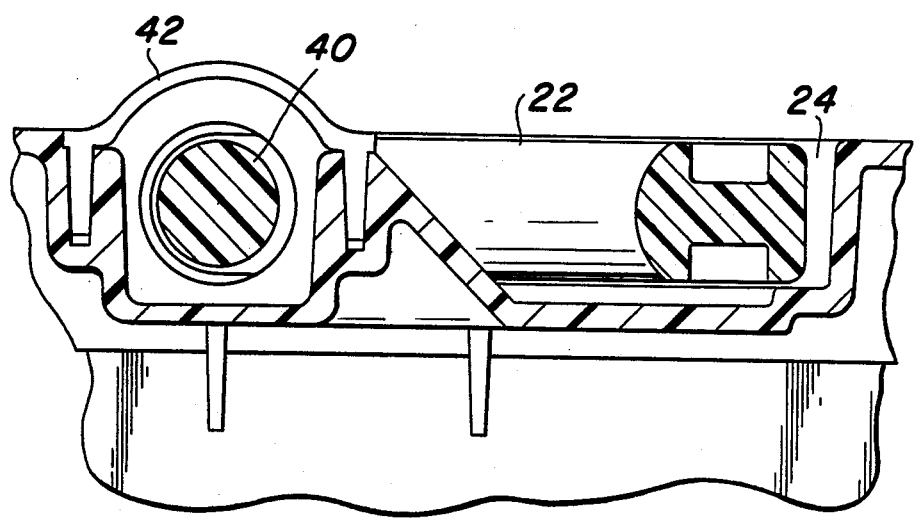
FIG. 6 is a partial section through the battery cover shown in FIG. 1, taken in the direction of arrows 6—6 of FIG. 1, and illustrates the handle in the stowed position.

Referring to FIGS. 5 and 6, movable handle 22 is shown in more detail. Each identical end 38 of handle 22 is attached to cover 2 by a cylindrical shaft 40. Handle 22, which can rotate about shaft 40, is shown in FIG. 5 in its upright position for carrying the battery and in its stowed position in FIG. 6. Shaft 40 has a diameter substantially equal to about one-half of the height of cover 2 and is held in place by retaining member 42. Member 42 protrudes upward where it is adjacent to shaft 40, since the diameter of the shaft is substantially equal to about one-half of the height of cover 2. This structural design ensures that handle 22 is adequately attached to cover 2 by maximizing the diameter of shaft 40.

Some dimensional aspects of the battery structure will now be described. In preferred embodiments of the invention, one piece cover 2 has its height minimized to allow the height of battery container 12 to be maximized without increasing the overall battery height. In constructing cover 2 its minimum height is limited only by the required size of termination means 4 which is dimensioned to meet industry standards for physical interconnection and current carrying capacity. With reference to FIG. 3, the dimensions of a battery cover, according to the invention, can be constructed with a height "C" not exceeding the external dimension of 1.0 inch. Additionally, this allows a battery to be constructed with an overall height "H" from the bottommost surface of the battery container to the top of the battery posts, that does not exceed 7.8 inches.

The operation and method of using the storage battery in a typical automotive application will now be described with reference to the figures. Battery posts 14 are designed to accept conventional pressure clamp battery cable clamps. The location of posts 14 in the center of cover 2, as shown in FIG. 1, allows the battery to be used for cables with pressure clamps regardless of the cable orientation. If the cables are oriented with the positive polarity cable on the left side and the negative polarity cable on the right side, the battery can be used in the position shown in FIG. 1. However, if the negative and positive polarity cables are reversed, the battery can still be used simply by rotating it 180° from the orientation shown in FIG. 1.

The battery can also be used in automotive applications which utilize battery cables with cable ends designed to be attached to conventional side mount terminals. Terminals 18 are typical side mount terminals which can accept such battery cable ends. Additionally, location of terminals 18 on sloped portions 16 of cover 2 allows battery cables equipped for attachment to side mount terminals to be used without cable modification such as an increase in length. In typical applications the unused posts or terminals can be covered. If terminals 18 are used, form fitting plastic covers (not shown) can be placed on posts 14. Alternatively, if posts 14 are used, a plastic cover (not shown) can be placed on terminals 18 or a threaded cover (not shown) can be threaded into the terminals.

Handling of the battery is made very easy with the inclusion of handle 22. Handle 22, in its upright position as shown in FIG. 1, allows the user to carry the battery with one hand. Once the battery is placed in position, the handle can be stowed or folded into recess 24 such that it is flush with the top surface of cover 2 and therefore completely out of the way. This allows a typical battery hold down bracket (not shown) which extends across cover 2 to still be used since handle 22 stowed in recess 24 will not interfere with the bracket. Additionally, the ability to completely stow handle 22 in recess 24 allows the convenience of a handle without any subsequent increase in overall battery dimensions.

Height adjustment apparatus 26 can be removed from the battery if the height of battery container 12 and cover 2 is appropriate alone. Additionally, a plurality of bases 28 can be provided with different heights so height apparatus 26 can be used to adapt the battery to a multitude of different dimensional requirements.

There has thus been shown and described a novel universal terminal storage battery with handle which fulfills all the objects and advantages sought. Many changes, modifications, variations, and other uses and applications of the subject invention, will, however, become apparent to those skilled in the art after considering the specification and the accompanying drawings which disclose the preferred embodiments. All such changes, modifications, variations, and other uses and applications within the spirit and scope of the invention are deemed to be covered by the invention which is limited only by the claims which follow.

We claim:

1. A storage battery, comprising:
   (a) a battery container for housing the elements of said storage battery;
   (b) a one piece cover attached to the top of said storage battery container, said cover having a first and a second sloping portion located at a cover longitudinal edge adjacent each front corner of said battery;
   (c) a first pair of upwardly protruding battery posts located along a longitudinal centerline of said cover, each of said posts adjacent opposite sides of said battery cover;
   (d) a second pair of battery terminals, comprising a first terminal located on said first sloping portion of said cover and a second terminal located on said second sloping portion of said cover, each of said terminals being internally threaded connectors substantially parallel to said respective sloping portions of said cover;
   (e) a pair of metal adapters integral with said cover, each adapter electrically connected to one battery post and one battery terminal and capable of being electrically connected to said battery plate;
   (f) a movable handle rotatably snap-connected to the cover by a cylindrical shaft and is held in place by a retaining member oriented in a recess in said cover and located between said pair of battery posts and on the said longitudinal centerline, said handle having an upright position for carrying said battery in a stowed position wherein said handle is stowed in said recess in said cover, oriented on a first side of said longitudinal center line, such that said stowed handle lies below said battery posts and substantially at or below the uppermost surface of said cover; and
   (g) at least one removable vent cap on said cover oriented on a second side of said longitudinal center line.

2. The battery of claim 1, wherein said cover external height does not exceed 1.0 inch.

3. The battery of claim 1, wherein said handle has a first end and a second end, each end being connected to said battery cover in said recess by a cylindrical shaft having a diameter substantially equal to about one-half the height of said cover, said portion of said cover receiving each of said shafts protruding upward beyond the topmost surface of said cover but below the top of said first pair of battery terminals.

4. The battery of claim 1, wherein said maximum battery height from the bottommost surface of said battery to the top of said battery posts does not exceed 7.8 inches.

5. The battery of claim 1, wherein said battery further comprises means for adjusting the height of said battery.

6. The battery of claim 5, wherein said means for adjusting the height of said battery comprises height adjustment apparatus affixed to said battery container and located adjacent said bottommost surface of said battery container, so that the overall height of said battery, from said bottommost surface of said battery to said top of said battery posts, is adjustable.

7. A storage battery including:
   (a) two pair of terminals on a cover of said storage battery, a first pair of said terminals comprising upwardly extending posts located substantially along a longitudinal center line of said cover, each of said posts adjacent opposite sides of said cover;
   (b) a second pair of battery terminals each being internally threaded connectors oriented adjacent a longitudinal edge of said cover adjacent a corner of said cover;
   (c) a pair of integrally formed conductive metallic adapters, each extending between and forming one of said battery posts and one of said battery terminals, electrically connected to plates of said storage battery substantially at a midpoint of said conductive metallic adaptors;
   (d) a moveable handle rotatably snap-connected to the cover by a cylindrical shaft and is held in place by a retaining member oriented in a recess in said cover and located between said pair of battery posts, said retaining members oriented on said longitudinal centerline, said handle having an upright position for carrying said battery and a stowed position wherein said handle is stowed in said recess in said cover, oriented on a first side of said longitudinal centerline, such that said stowed handle lies below said battery posts and substantially below or at an uppermost surface of said cover; and
   (e) at least one removable vent cap on said cover, oriented on a second side of said longitudinal centerline.

8. The storage battery of claim 7, wherein said conductive metallic adapters are encased by said battery cover but for said upwardly extending posts and said battery terminals.

9. The storage battery of claim 7, wherein a portion of said conductive metal adapters is enclosed by said cover such that only said posts and said battery terminals are exposed when said cover is oriented on said storage battery.

10. An improved storage battery having two pairs of terminals, first pair of upwardly extending posts located substantially on a longitudinal centerline of a top of said storage battery and second pair of terminals each being an internally threaded connector oriented adjacent a longitudinal edge of said storage battery wherein the improvement comprises:
    (a) a pair of conductive integrally formed metallic adapters each extending between and forming one of said battery posts and one of said battery terminals, electrically interconnected to plates of said battery at substantially a midpoint of said conductive metallic adapters; and
    (b) a movable handle rotatably snap-connected to the cover by a cylindrical shaft and is held in place by a retaining member oriented in a recess in said top cover, said retaining member oriented on said longitudinal centerline between said pair of battery posts, said handle having an upright position for carrying said battery and a stowed position wherein said handle is stowed in said recess in said top cover in an orientation below said battery posts and substantially below or at an uppermost surface of said cover.

11. The improved storage battery of claim 10, wherein said conductive metallic adapters are encased by a cover for said storage battery but for said posts and said terminals.

12. The improved storage battery of claim 11, wherein a portion of said conductive metallic adapters is enclosed by a cover for said storage battery such that only said posts and said battery terminals are exposed when said cover is oriented on said storage battery.

13. The improved storage battery of claim 10, wherein said top cover external height does not excess 1.0 inch.

14. The improved storage battery of claim 10, wherein said retaining member oriented in said recess have a height equal to or greater than one-half the height of said top cover.

15. The improved storage battery of claim 10, wherein said recess is oriented on a first side of said longitudinal centerline and including at least one removable vent cap on said cover, oriented on a second side of said longitudinal centerline.

* * * * *

UNITED STATES PATENT AND TRADEMARK OFFICE
CERTIFICATE OF CORRECTION

PATENT NO. : 4,752,543

DATED : June 21, 1988

INVENTOR(S) : Carl J. Anderson et al

It is certified that error appears in the above—identified patent and that said Letters Patent is hereby corrected as shown below:

ON THE TITLE PAGE, insert --[73] Assignee: General Battery Corporation, Reading, Pa.--

Signed and Sealed this

Thirty-first Day of January, 1989

*Attest:*

DONALD J. QUIGG

*Attesting Officer*      *Commissioner of Patents and Trademarks*